United States Patent

Fisher et al.

[15] 3,691,383
[45] Sept. 12, 1972

[54] DEVICE TO MEASURE INFRARED RADIATION

[72] Inventors: Peter D. Fisher, Okemos, Mich.; Dickron Mergerian, Baltimore; Ronald W. Minarik, Lutherville, both of Md.

[73] Assignee: Westinghouse Electric Corporation, Pittsburgh, Pa.

[22] Filed: June 9, 1970

[21] Appl. No.: 45,100

[52] U.S. Cl. ..............................250/83.3 H, 250/83 R
[51] Int. Cl. ..............................G01j 1/00, G01j 5/00
[58] Field of Search ........................250/83.3 H, 83 R

[56] References Cited

UNITED STATES PATENTS 3,130,254  4/1964  Sorokin et al.....250/83.3 H X
3,407,297  10/1968  Garrett.................250/83.3 H

FOREIGN PATENTS OR APPLICATIONS 913,175  12/1962  Great Britain........250/83.3 H Primary Examiner—Archie R. Borchelt
Attorney—F. H. Henson, E. P. Klipfel and S. Weinberg

[57] ABSTRACT

A device for detecting and measuring the output of a specific laser. The detector is a crystal which absorbs the light from the laser and converts the light into heat energy. A heat responsive, variable resistor-type element is located on the crystal to sense the heat. By measuring the change in current and voltage through the resistor-type element, the intensity of the laser light can be determined.

9 Claims, 3 Drawing Figures

PATENTED SEP 12 1972         3,691,383

WITTNESSES
Alfred G. Colaizzi
Leon M. Garman

INVENTORS
Peter D. Fisher
Donald Mergerian
Ronald W. Minarik
Stanley Weinberg
ATTORNEY

DEVICE TO MEASURE INFRARED RADIATION

BACKGROUND OF THE INVENTION

1. Field of the Invention

This invention relates to infrared detectors in general and, in particular, to an infrared detector for measuring the intensity of the output of an optical energy source such as a laser.

2. Description of the Prior Art

Scientists and engineers have had little trouble in building an assortment of coherent infrared sources in the form of lasers. These lasers have found many practical applications in the military and scientific communities. However, scientists have had a very difficult time developing efficient detectors of the infrared radiation from these lasers. Up until now, all infrared detectors which were used to measure the intensity of laser output have been broadband detectors. As a result, great difficulty has been experienced in obtaining precise measurements of the intensity of light emitted by a laser because the light was mixed in with too much background noise, i.e., energy at other frequencies.

Such broadband detectors have typically been referred to as "black body" detectors in the prior art. Typical of such black body detectors is shown by the patent to Baker, U.S. Pat. No. 3,282,100. Baker shows a device which receives laser light and changes its resistance in an amount which is proportional to the amount of energy absorbed. The amount of energy absorbed is then measured by a Wheatstone bridge circuit. However, Baker is subject to receiving any and all radiation which might be near his calorimeter, not just the light which is coming from the laser.

BRIEF SUMMARY OF THE INVENTION

The present invention, however, is a narrowband detector which will efficiently detect and measure radiant energy from a specific laser source by converting the laser energy from a first form (light) to a second form (heat). The detector comprises a crystal for absorbing the energy and a temperature responsive device such as a resistor placed in close proximity to the crystal. The light emanating from the laser is absorbed by the crystal and is converted to heat energy. The heat energy changes the resistance of the resistor which is preferably mounted on the crystal. An external circuit including a load is connected to the variable resistor. As the resistance of the variable resistor is changed, the change in the current and voltage across the load is monitored thereby giving an accurate measurement of the intensity of the incident light from the laser.

BRIEF DESCRIPTION OF THE DRAWINGS

For better understanding of the invention, reference may be had to the preferred embodiment, exemplary of the invention, as shown in the accompanying drawings in which.

DETAILED DESCRIPTION OF THE INVENTION

In general, this invention teaches a device which provides an accurate indication of the intensity of the energy being emitted by a particular source. Specifically, it teaches an apparatus which is capable of measuring the intensity of light radiation from a laser. More specifically, it teaches a device which can accurately measure the intensity of light emitted by a specific laser at a specific wavelength—$1.1\mu$ (micron).

The theory of operation of the detector is basically the same as that which explains the operation of a laser. Briefly, the theory is based on the Bohr theory of the atom which specifies that the electrons in an atom will be caused to vibrate between two or more discrete energy levels if certain predetermined, discrete quanta of energy strike the atom and are absorbed by it. When the proper amount of energy is absorbed by an atom causing certain of its electrons to vibrate between the aforementioned discrete energy levels, the electrons are said to be undergoing a resonance transistion.

Figure 1:
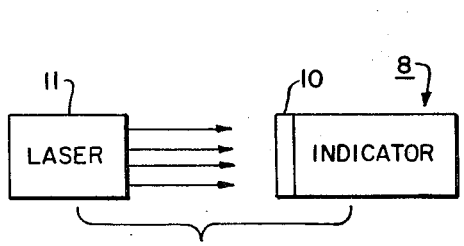
FIG. 1 is a block diagram illustrating an environmental use of the present invention.

In the specific case of this invention and with reference to FIG. 1, the detector portion 10 of the indicator 8 is constructed of the same material as the transmitting portion of the laser 11. The two materials are chosen to be exactly the same so that the absorption bandwidth of the detector will exactly match the bandwidth of the energy being generated by the laser. In such a case, there is a high probability that most of the generated energy will be absorbed by the detector. In the general case, however, the detector need not be constructed of the same material as the generator as long as it adequately responds to light of the specific wavelength being generated by the laser.

Figure 2:
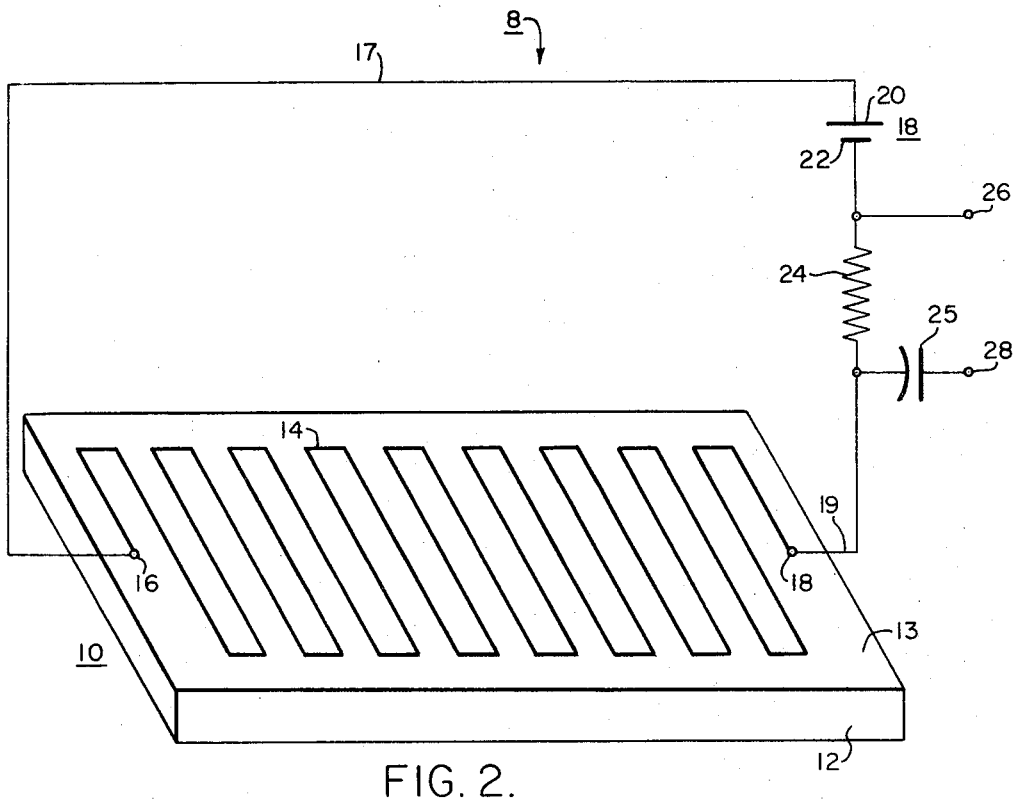
FIG. 2 is a schematic representation showing the indicator apparatus of FIG. 1 in more detail.

With reference to FIG. 2, the detector is generally indicated by the numeral 10. In the embodiment shown in the figure, the narrowband detector 10 is designed to detect radiation from a $1.1\mu CaF_2:Tm^{2+}$ laser.

To detect the radiation emitted by such a $1.1\mu$ source, the detector of this invention must operate efficiently in a very narrowband about $1.1\mu$. Because, in the specific case, the detector 10 is constructed of the same material as the laser, we need not be concerned with the exact bandwidth about $1.1\mu$. That is, the detector will be capable of absorbing exactly what is emitted by the laser. Those skilled in the art will appreciate that the bandwidth will be very narrow. Typically, the bandwidth might be ± 1 A. Thus, in the specific case, the basic component of the detector 10 is a first energy absorbing means in the form of a crystal 12 constructed of $CaF_2:Tm^{2+}$— the same material of which the laser is made. However, the crystal can be made of any material which has a strong resonance transition at $1.1\mu$.

In equilibrium at room temperature, the ground state of the crystal 12 is occupied by electrons. When photons of $1.1\mu$ radiation strike the crystal 12, the crystal absorbs the photons causing some of the electrons to rise to an excited state — the $2_{F_{5/2}}$ state. The notation, $2_{F_{5/2}}$, is standard spectroscopy notation for electron movement as explained in Molecular Spectra and Molecular Structure, I. Spectra of Dratomic Molecules by G. Herzberg, 2nd edition, 5th printing, 1957, where F represents the orbital angular momentum, 5/2 represents the orbital angular momentum less the spin angular momentum, and 2 represents a multiplicity factor. This rise of electrons to the excited state is caused by a very strong resonance transistion in the $Tm^{2+}$.

In a very short time, some of the electrons in the excited state fall back to the ground state according to the very strong resonance transistion in $TM^{2+}$ from $$2_{F_{5/2}} \Longrightarrow 2_{F_{7/2}}$$

When the electrons fall to the ground state via a non-radiative transition (the $2_{F_{7/2}}$ state) a number of phonons are emitted. The phonons are actually lattice vibrations in the crystal which serve to heat the crystal. The crystal 12 was chosen to be $CaF_2$ doped with thulium because there is a high probability that an incident photon will be absorbed by the crystal and raise an electron to the higher energy state.

According to the law of conservation of energy, the amount of energy fed into a system must equal the amount of energy coming out of the system. Therefore, when electrons fall to the lower energy state, phonons are emitted causing heat to be generated in the crystal. A second energy absorbing means in the form of a temperature sensitive device is placed in close proximity to the crystal to absorb the generated heat. By thus absorbing the heat, the invention is able to measure the change in temperature of the crystal due to the heat generation.

In order to measure the temperature change in the crystal 12, a temperature sensitive electrical device 14 is placed on one face 13 of the crystal 12. In the preferred embodiment, a thin film, temperature sensitive conductor such as $Nb_2O_5$ is deposited on the crystal. Although $Nb_2O_5$ is used in the preferred embodiment, it will be apparent that any similar type of thin film conductor could likewise be used in its place. As shown in the figure, the conductor must be arranged over the face of the crystal so that it covers a substantial portion of the area of the face on which it is deposited.

One terminal 16 of the conductor 14 is connected to the positive terminal 20 of a battery 18 by way of line 17. The other terminal 18 of the wire conductor 14 is connected to a load resistor 24 by way of line 19. The change in voltage across the load resistor 24 can be monitored across output terminals 26 and 28. One terminal of the load resistor 24 is connected to the output terminal 28 by means of a coupling capacitor 25.

Under normal conditions, when no laser light flows into the crystal 12, the resistance of the film conductor 14 will be at a preselected, stationary level and a steady-state current will flow through the wire 14, the current being generated by the battery 18. As a result, a steady-state current and voltage will also be found to exist in load resistor 24. However, under steady state conditions, no indication will appear across terminals 26, 28 because capacitor 25 blocks the steady-state DC.

When laser light is incident upon the crystal 12 in the form of radiation having a wavelength of $1.1\mu$, the crystal will increase in temperature thereby causing a decrease in the resistance of the thin film conductor. Consequently, the current through the conductor and through the rest of the circuit will increase causing an increase in current and voltage through load resistor 24. This increase in current and voltage across the load resistor is monitored across the output terminals 26 and 28. By using these measurements, it can easily be determined what the value of the incident energy from the laser must have been.

Therefore, the present invention is a very efficient narrowband detector which will detect radiation having a wavelength of $1.1\mu$. Unlike the prior art devices which are usually painted a dull black in order to absorb all radiation, the crystal 12 is purposely not painted black. In fact, it is practically colorless and would be transparent except for the slight coloring provided by the thulium. If it were painted black (as is done in the prior art), the crystal would absorb energy of all frequencies which would result in too much background noise to enable $1.1\mu$ to be detected. Although it would be an excellent general purpose detector of $1.1\mu$ radiation, the present detector, because of its very narrowband properties is particularly well suited for applications where the desired signal must be sorted out from a very intense background of electromagnetic radiation.

Figure 3:
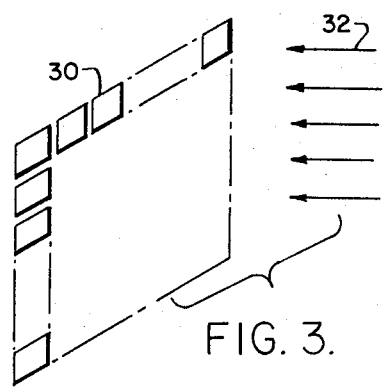
FIG. 3 illustrates an array of detectors.

In an alternative arrangement, hundreds of these crystals can be used as building blocks. As illustrated in FIG. 3 they can be laid side by side to form a mosaic 30 which can be used to receive reflected laser light 32 to reproduce images represented thereby. The size of each crystal will depend upon the resolution desired. If high resolution is desired, each crystal will be smaller than would be the case if lower resolution were desired.

We claim:

1. The combination of a first device operable to generate radiant energy of a specific bandwidth and a second device operable to detect the presence of said radiant energy and to measure its intensity, part of said second device being constructed of exactly the same materials as said first device.

2. Apparatus for measuring the intensity of radiant energy in a first form comprising first means for absorbing said energy while in said first form, said first absorbing means being operable to convert said energy to a second form by a resonance transition, and means for measuring the intensity of said energy in said second form.

3. The apparatus of claim 2 wherein said measuring means includes second means for absorbing said energy in said second form.

4. The apparatus of claim 2 including a load device and wherein the measuring means includes means for measuring the changes in the electrical parameters across said load in response to the transition of said energy to said second form.

5. The apparatus of claim 2 wherein the energy in said first form is light in the infrared region and the energy in said second form is heat energy.

6. The apparatus of claim 5 wherein the first absorbing means is very light in color and is substantially transparent.

7. The apparatus of claim 3 wherein said second absorbing means comprises a temperature responsive conductor.

8. The apparatus of claim 3 wherein said second absorbing means is in close proximity to said first absorbing means.

9. Apparatus for reproducing images comprising a plurality of devices for measuring the intensity of energy emanating from a laser, each of said devices comprising a means for absorbing said energy, said absorbing being operable to convert said laser energy into energy of a different form, and means for measuring the intensity of said energy in said different form.

* * * * *